United States Patent [19]
Eikevik

[11] 3,718,314
[45] Feb. 27, 1973

[54] GATE VALVE AND METHOD OF MAKING THE SAME

[76] Inventor: Arne Eikevik, 122 Washington Street, Merrick, L. I., N.Y.

[22] Filed: Sept. 24, 1970

[21] Appl. No.: 74,969

[52] U.S. Cl....................................251/329, 251/366
[51] Int. Cl..................................................F16k 27/10
[58] Field of Search...............................251/329, 366

[56] References Cited

UNITED STATES PATENTS

| | | | |
|---|---|---|---|
| 1,370,224 | 3/1921 | Redding | 251/366 X |
| 3,353,786 | 11/1967 | Combes | 251/329 |

FOREIGN PATENTS OR APPLICATIONS

| | | | |
|---|---|---|---|
| 1,271,227 | 7/1961 | France | 251/329 |
| 410,124 | 3/1945 | Italy | 251/329 |
| 846,760 | 6/1939 | France | 251/366 |

*Primary Examiner*—Arnold Rosenthal
*Attorney*—Donald J. Perrella

[57] ABSTRACT

A gate valve body is formed from a U-shaped member wherein each leg and the bottom connecting portion of the U-shaped member have a substantially U-shaped cross-section. The arms of the U-shaped cross-section of each leg face each other. A filler plate having a concave bottom surface is extended across the front face of the U-shaped member downwardly from the free end of each leg and welded to a facing arm of each leg. A second similar filler plate is extended across the rear face of the U-shaped member and similarly welded. An attaching plate having a cut-out center portion is welded to the free ends of the legs of the U-shaped member and to the top surfaces of the filler plates.

The bonnet portion of the valve is formed from a second U-shaped member wherein each leg and the upper connecting portion of the U-shaped member have a substantially U-shaped cross-section. The arms of the U-shaped cross-section of each leg face each other. A semi-circular filler plate is positioned across the front face of the member to fill the opening between the legs and is welded to a facing arm of each leg. A similar filler plate is welded similarly to the rear face of the member. A second attaching plate having a cut-out inner portion is welded to the free ends of the legs of the U-shaped member and to the bottom surfaces of the filler plates. A hole is provided in the center of the connecting portion of the U-shaped member.

3 Claims, 4 Drawing Figures

PATENTED FEB 27 1973

INVENTOR.
ARNE EIKEVIK
BY
Donald J. Perrella
ATTORNEY

INVENTOR.
ARNE EIKEVIK
BY
Donald J. Perrella
ATTORNEY

GATE VALVE AND METHOD OF MAKING THE SAME

OBJECTS OF THE INVENTION

It is an object of the present invention to provide an improved gate valve. Another object is to provide a gate valve which can be made of the same material as the pipeline to which it is connected. Still another object is to provide a gate valve which can be manufactured easily and economically. Yet another object is to provide a gate valve of uniform strength, improved reliability and reduced rate of failure in service. A further object is to provide a simplified method for fabricating a gate valve. These and other objects of the present invention will be apparent from the following description.

BRIEF DESCRIPTION OF THE DRAWING

Referring now to the drawing.

DETAILED DESCRIPTION

The gate valve of the present invention is prepared by joining together a relatively few members which may be, and preferably are, all formed of the same material.

Figure 1:
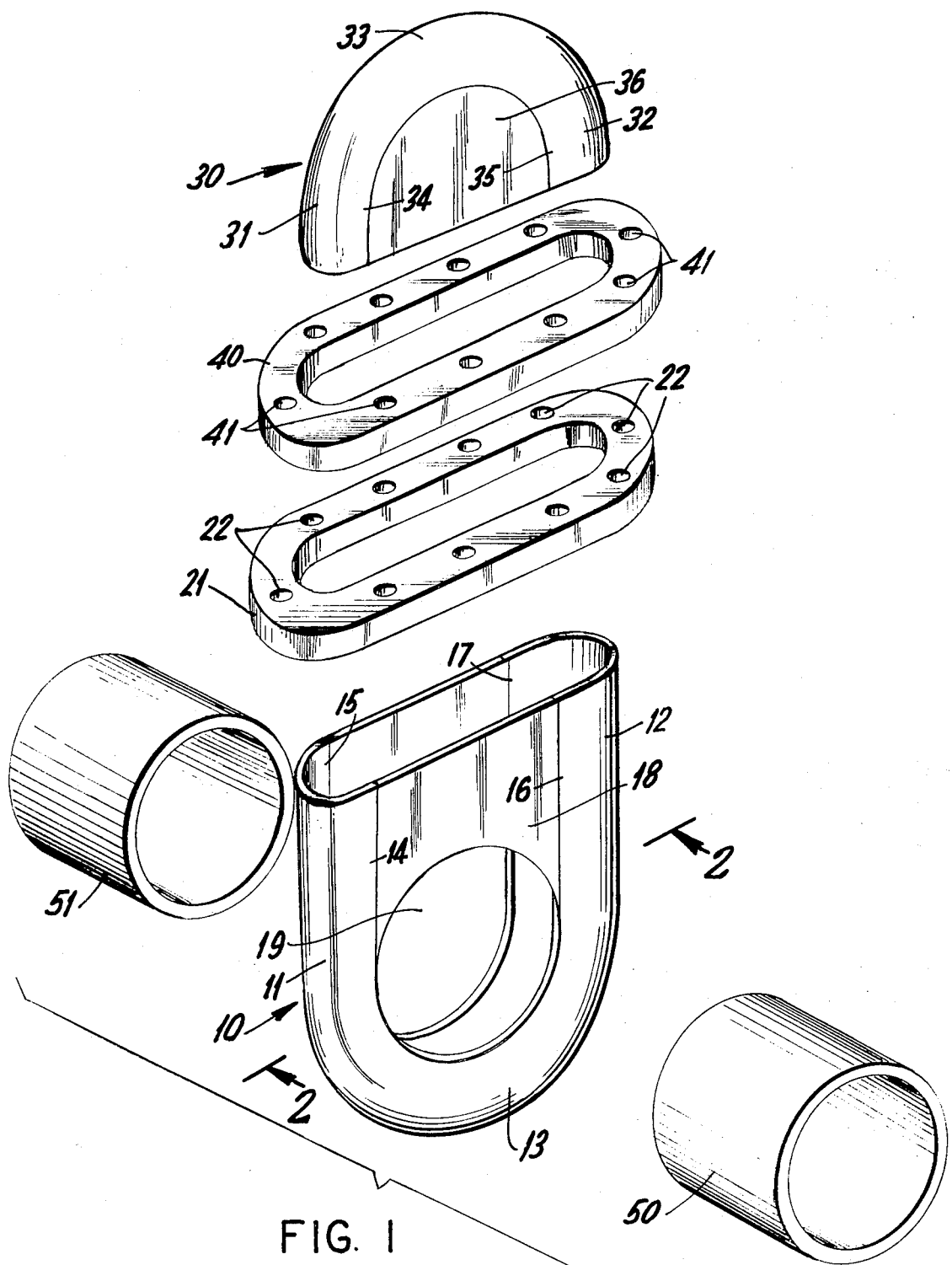
FIG. 1 is an exploded isometric view showing the manner of fabrication of a gate valve of the invention.
Figure 2:
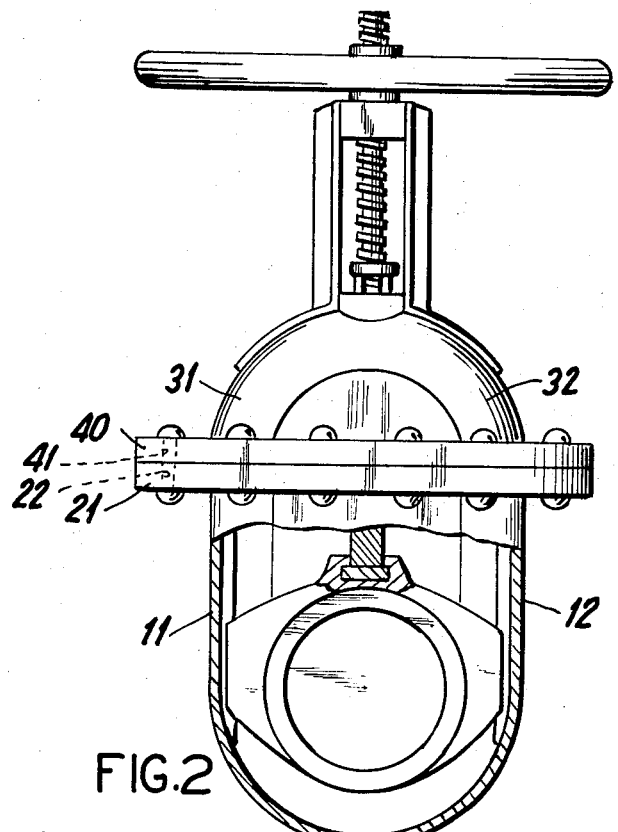
FIG. 2 is a side elevation of the assembled valve taken along the line 2—2 of FIG. 1, and FIGS. 3 and 4 show the number and location of weld seams in valves according to the present invention.
Figure 3:
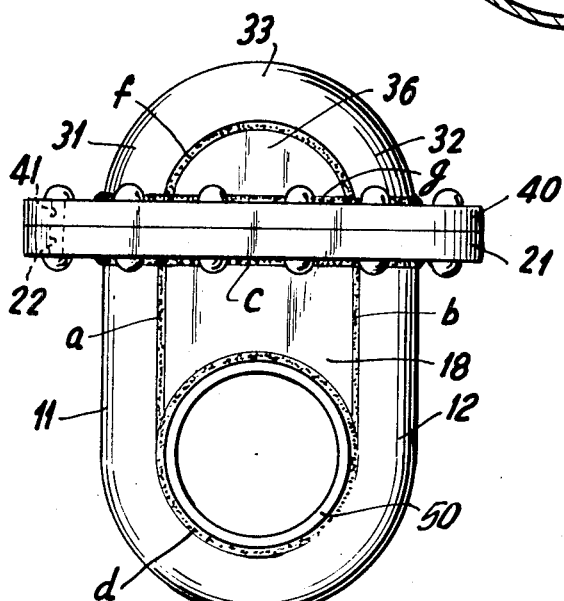
Figure 4:
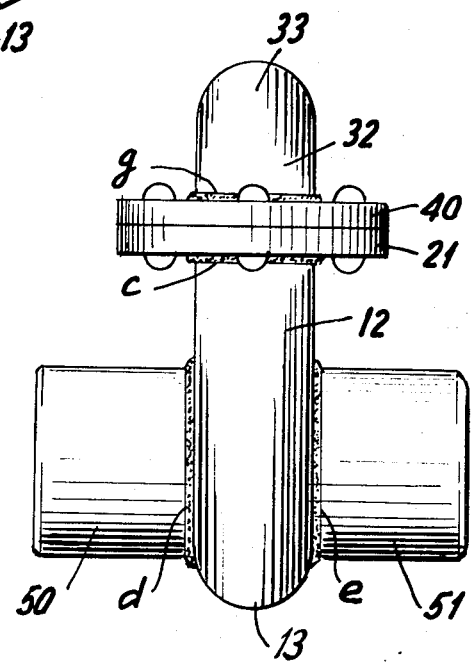

The starting material is a U-shaped member 10 (FIG. 1) which may have been prepared in any suitable manner, for example by bending an appropriate length of pipe into a U-shape and cutting the bent pipe in half (not shown as obvious) or by cutting a straight length of pipe in half followed by bending it into a U-shape (not shown as obvious). The U-shaped member 10 has legs 11 and 12 and a bottom connecting portion 13. In horizontal cross-section leg 11 has arms 14 and 15 and leg 12 has arms 16 and 17. Arms 14 and 16 are on the front face of FIG. 10 while arms 15 and 17 are on the rear face of FIG. 10. A filler plate 18 having a flat top surface and a concave bottom surface is positioned across the front face of member 10 extending downwardly from the free ends of legs 11 and 12 and is welded to arm 14 of leg 11 and arm 16 of leg 12 as shown in FIG. 1. The weld seams a and b are shown in FIG. 3. The concave bottom surface of filler 18 and the bottom connecting portion of member 10 form a substantially circular opening 19 adapted to receive a conduit. A second filler plate 20, similar to plate 18, is similarly positioned along the rear face of member 10 and is welded to arms 15 and 17. An attaching plate 21 (FIG. 1) having a cut-out center portion and provided with a plurality of openings 22 adapted to receive joining members, for example, bolts or rivets, is welded to the free ends of legs 11 and 12 and to the tops of filler plates 18 and 20 as shown in FIG. 3. The weld seam c is shown in FIGS. 3 and 4.

The bonnet of the gate valve is prepared similarly to the body from a U-shaped member 30 (FIG. 1) which may have been prepared in any suitable manner, for example as described above for member 10. Like 10, member 30 has legs 31 and 32 and upper connecting portion 33. In cross-section leg 31 has arm 34 on its front face and a second corresponding arm (not shown) on its rear face. Leg 32 has arm 35 on its front face and a second corresponding arm (not shown) on its rear face. A semicircular filler plate 36 is positioned across the front face of member 30 and welded to arms 34 and 35. The weld seam f is shown in FIG. 3. A second filler plate (not shown), similar to plate 36, is similarly positioned along the rear face of member 30 and welded to the arms on the rear face of member 30. A second attaching plate 40 having a cut-out center portion and provided with a plurality of openings 41 adapted to receive joining members, for example bolts or rivets, is welded to the free ends of legs 31 and 32 and to the bottom of filler plate 36 and the corresponding plate on the rear surface of member 30. The weld seam g is shown in FIGS. 3 and 4. The bonnet is then adapted for attachment to the body by positioning plate 40 over plate 21 and inserting bolts or rivets through registering openings 41 and 22.

A section of pipe 50 (FIG. 1) machined at an angle suitable for forming a seat for the gate, e.g. about 5°, is inserted into opening 19 in the valve body and welded to the valve body around the bottom of member 18 and the bottom connecting portion 13 of member 10. The weld seam d is shown in FIGS. 3 and 4. A second section of pipe 51, the end of which is also machined at an angle to form the other seat of the valve, is inserted in the corresponding opening (not shown) on the rear face of the valve and welded along the bottom surface of member 20 and the bottom connecting portion of the rear face of member 13. The weld seam e is shown in FIG. 4. Before pipe sections 50 and 51 are welded to the valve body, the ends which have been cut at an angle are given an overlay of metal (not shown as conventional). The type of metal used for the overlay will depend on the intended application of the valve. Typical overlay metals are, for example, Monel, stainless steel, brass or Stellite. The free ends of sections 50 and 51 are joined to other sections of pipe by conventional means (not shown), for example, by flanges or by butt welding.

The foregoing describes the preparation of a gate valve body according to the present invention. Before the bonnet is attached to the body, a hole is cut in the center of the upper connecting portion 33 to permit attachment of valve stem, stuffing box and other conventional components of gate valves, these components not being shown inasmuch as they are conventional and therefore obvious.

What is claimed is:

1. A gate valve body formed of a weld-free substantially U-shaped member having two legs and a connecting member joining the two legs, each leg and the connecting member having a substantially semi-circular cross-section, the ends of the cross-sections of each leg facing each other, a flat filler plate having a concave bottom surface extending across the front face of the substantially U-shaped member from the edge of one leg to the edge of the opposite leg, the filler plate being welded to the facing ends of each leg, a second flat filler plate having a concave bottom surface extending across the rear face of the substantially U-shaped member from the edge of one leg to the edge of the opposite leg, the filler plate being welded to the facing ends of each leg, the arcuate lower portion of the filler plates and the connecting member forming an opening on the front face and an opening on the rear face, each opening adapted to receive a conduit, a pipe section welded in both the front and rear openings, the end of each pipe section being cut at an angle, the cut ends being converging seats adapted to receive a wedge shaped valve member.

2. A gate valve having a body according to claim 1, an attaching plate having a cut-out center portion welded to the free ends of the legs of the U-shaped member and to the top surfaces of the filler plates.

3. A gate valve having a body according to claim 1 and a bonnet formed of a second substantially U-shaped member, each leg and the upper connecting portion of the second U-shaped member having a substantially semi-circular cross-section, the ends of the cross-sections of each leg facing each other, a filler plate extending across the front face of the second member and filling the arcuate opening circumscribed by the legs and the upper connecting portion of the second U-shaped member, and a second filler plate extending across the rear face of the second member and filling the arcuate opening circumscribed by the legs and the upper connecting portion of the second U-shaped member.

* * * * *